US011270183B2

(12) United States Patent
Lin

(10) Patent No.: US 11,270,183 B2
(45) Date of Patent: Mar. 8, 2022

(54) TRANSITIONAL LAYER FOR ELECTRONIC MODULES AND PRODUCING METHOD THEREOF

(71) Applicant: Wu-Hsu Lin, Taichung (TW)

(72) Inventor: Wu-Hsu Lin, Taichung (TW)

( * ) Notice: Subject to any disclaimer, the term of this patent is extended or adjusted under 35 U.S.C. 154(b) by 19 days.

(21) Appl. No.: 16/344,378

(22) PCT Filed: Dec. 29, 2017

(86) PCT No.: PCT/CN2017/119867
§ 371 (c)(1),
(2) Date: Apr. 24, 2019

(87) PCT Pub. No.: WO2019/127371
PCT Pub. Date: Jul. 4, 2019

(65) Prior Publication Data
US 2021/0210362 A1 Jul. 8, 2021

(51) Int. Cl.
*G06K 19/077* (2006.01)
*G06K 19/07* (2006.01)

(52) U.S. Cl.
CPC ... *G06K 19/07728* (2013.01); *G06K 19/0718* (2013.01); *G06K 19/07724* (2013.01)

(58) Field of Classification Search
CPC ......... G06K 19/0718; G06K 19/07354; G06K 19/07701; G06K 19/07716;
(Continued)

(56) References Cited

U.S. PATENT DOCUMENTS 6,851,617 B2 * 2/2005 Saint ..................... G06K 1/121
                                                        235/375
7,701,352 B2    4/2010 Forster
(Continued)

FOREIGN PATENT DOCUMENTS

CN          202677264 U      1/2013
JP          2017110041 A     6/2017
(Continued)

*Primary Examiner* — Thien M Le
*Assistant Examiner* — April A Taylor
(74) *Attorney, Agent, or Firm* — Alan D. Kamrath; Karin L. Williams; Mayer & Williams PC

(57) ABSTRACT

An electronic module preparation layer (A) and a manufacturing method therefor. The electronic module preparation layer (A) comprises a substrate (10), multiple electronic modules (20) and two release layers (30, 40). The multiple electronic modules (20) are coated in the substrate (10) by means of the two release layers (30, 40) so as to provide a protective effect. When a user needs to input a program code to various electronic modules (20), since one of the release layers, i.e. the release layer (40), is provided with an operation hole (42), a chip (21) and a fingerprint identification element (23) provided on various electronic modules (20) can communicate with the outside, and the user can directly carry out an operation of inputting the program code by means of the electronic module preparation layer (A), thereby effectively improving the defect in the prior art that various electronic modules (20) can easily be bent and damaged when directly inputting into the electronic modules (20), and an electronic module preparation layer (A) is thus provided.

18 Claims, 8 Drawing Sheets

(58) Field of Classification Search
CPC ....... G06K 19/07722; G06K 19/07724; G06K 19/07728; G06K 19/07739; B42D 25/23; B42D 25/313; B42D 25/45
See application file for complete search history.

(56) References Cited

U.S. PATENT DOCUMENTS

| | | | | |
|---|---|---|---|---|
| 2004/0062016 | A1* | 4/2004 | Kerr | G06K 19/07747 |
| | | | | 361/761 |
| 2007/0040688 | A1* | 2/2007 | Cocita | G06K 19/07749 |
| | | | | 340/572.7 |
| 2009/0303012 | A1* | 12/2009 | Ogata | G06K 19/07722 |
| | | | | 340/10.1 |

FOREIGN PATENT DOCUMENTS

| | | |
|---|---|---|
| TW | 201539329 A | 10/2015 |
| TW | 201633217 A | 9/2016 |

* cited by examiner

TRANSITIONAL LAYER FOR ELECTRONIC MODULES AND PRODUCING METHOD THEREOF

BACKGROUND OF THE INVENTION

1. Field of the Invention

The present invention relates to a transitional layer for electronic modules, and more particularly to a transitional layer that provides a convenient way to process the electronic modules and prevents the electronic modules from being damaged.

2. Description of Related Art

Conventional integrated circuit cards have become indispensable in life. Through the technique of radio-frequency identification (RFID), a user may utilize an integrated circuit card to transmit a signal with a non-contact inductive operation. In a conventional producing process of the integrated circuit cards, a programmed code is embedded into each one of the electronic modules of the integrated circuit cards one by one. Afterward, each one of the electronic modules will be mounted with a printed layer, and become a finished product of the integrated circuit card.

However, the electronic module is easy to be bended in the conventional producing process, and electronic components in the electronic module thereon may be damaged. As a result, the conventional producing process of the integrated circuit cards has a shortcoming of high cost, which should be improved.

SUMMARY OF THE INVENTION

To prevent the electronic modules from being bended to damage in the conventional producing process of the integrated circuit cards, the present invention provides a transitional layer for the electronic modules. Covering multiple electronic modules in a substrate with two release papers, the transitional layer may protect the multiple electronic modules from being damaged. Moreover, the transitional layer may be directly used for loading the multiple electronic modules with programmed codes. Thus the shortcoming of the prior art may be overcome effectively.

The present invention provides a transitional layer for electronic modules, and the transitional layer has a substrate, multiple electronic modules, and two release papers. The substrate has multiple containing holes disposed therethrough at spaced intervals. The multiple electronic modules are mounted to the substrate, and each one of the multiple electronic modules is located in a respective one of the multiple containing holes and has at least one input element. The two release papers are respectively mounted to the substrate and the multiple electronic modules via an adhesive coat, and at least one of the two release papers has operation holes disposed therethrough and aligning with the input elements of the multiple electronic modules.

Besides, in the aforementioned transitional layer for electronic modules, each one of the multiple electronic modules has multiple input elements, which comprise a chip, a button, and a fingerprint identification element, and the multiple input elements are disposed on a same surface of the electronic module.

Furthermore, in the aforementioned transitional layer for electronic modules, the multiple electronic modules are identically oriented and mounted to the substrate. One of the two release papers has said multiple operation holes disposed therethrough. The multiple operation holes respectively align with the input elements.

Moreover, in the aforementioned transitional layer for electronic modules, the substrate has multiple positioning parts disposed at spaced intervals. Each one of the two release papers has multiple release paper positioning parts aligning with the multiple positioning parts of the substrate.

The present invention also provides a producing method of a transitional layer for electronic modules, and the producing method comprises a substrate preparing step, an electronic modules mounting step, and a second release paper mounting step. The substrate preparing step comprises preparing a substrate having multiple containing holes disposed therethrough, and preparing a first release paper coated with viscose to paste on the substrate. The electronic modules mounting step comprises preparing multiple electronic modules, wherein each one of the multiple electronic modules has at least one input element, and putting each one of the multiple electronic modules in a respective one of the multiple containing holes. The second release paper mounting step comprises preparing a second release paper with multiple operation holes, coating the substrate and the multiple electronic modules with viscose, and pasting the second release paper on the substrate, wherein each one of the multiple operation holes communicates with a respective one of the input elements of the multiple electronic modules.

Besides, in the aforementioned producing method of a transitional layer for electronic modules, in the substrate preparing step, the substrate has multiple positioning parts disposed at spaced intervals. The first release paper has multiple first release paper positioning parts, and is pasted on the substrate by overlapping the multiple first release paper positioning parts and the multiple positioning parts of the substrate.

Besides, in the aforementioned producing method of a transitional layer for electronic modules, in the second release paper mounting step, the substrate has multiple positioning parts disposed at spaced intervals. The second release paper has multiple second release paper positioning parts, and is pasted on the substrate by overlapping the multiple second release paper positioning parts and the multiple positioning parts of the substrate.

Moreover, in the aforementioned producing method of a transitional layer for electronic modules, each one of the multiple electronic modules comprises multiple said input elements. The multiple input elements comprise a chip, a button, and a fingerprint identification element. The second release paper has multiple operation holes disposed therethrough. In the second release paper mounting step, the second release paper is pasted on the substrate with each one of the multiple operation holes communicating with a respective one of the chips or a respective one of the fingerprint identification elements of the multiple electronic modules.

Furthermore, in the aforementioned producing method of a transitional layer for electronic modules, after the second release paper mounting step, the producing method further comprises a rolling and standing step. The rolling and standing step comprises squeezing the two release papers for exhausting air between the substrate, the multiple electronic modules, and the two release papers, closely abutting the substrate and the two release papers, and packaging the multiple electronic modules.

The present invention further provides a producing method of integrated circuit cards comprising the aforementioned producing method of a transitional layer for electronic modules, a programmed code embedding step, and a printed layers pasting and cutting step. The printed layers pasting and cutting step comprises removing the two release papers, pasting two printed layers, and cutting the two printed layers, the substrate, and the multiple electronic modules into multiple integrated circuit cards.

By means of the aforementioned technical features, a user may directly use the transitional layer for electronic modules to embed programmed codes into the multiple electronic modules via the exposed chips and the exposed fingerprint identification elements, through the multiple operation holes of the second release paper. Throughout the process, the adhesive coats and the release papers provide the multiple electronic modules with effects of packaging and protecting. Therefore, the multiple electronic modules may be prevented from bending and thereby being damaged by the transitional layer for electronic modules, in comparison with the prior art.

DETAILED DESCRIPTION OF THE PREFERRED EMBODIMENT

Figure 1:
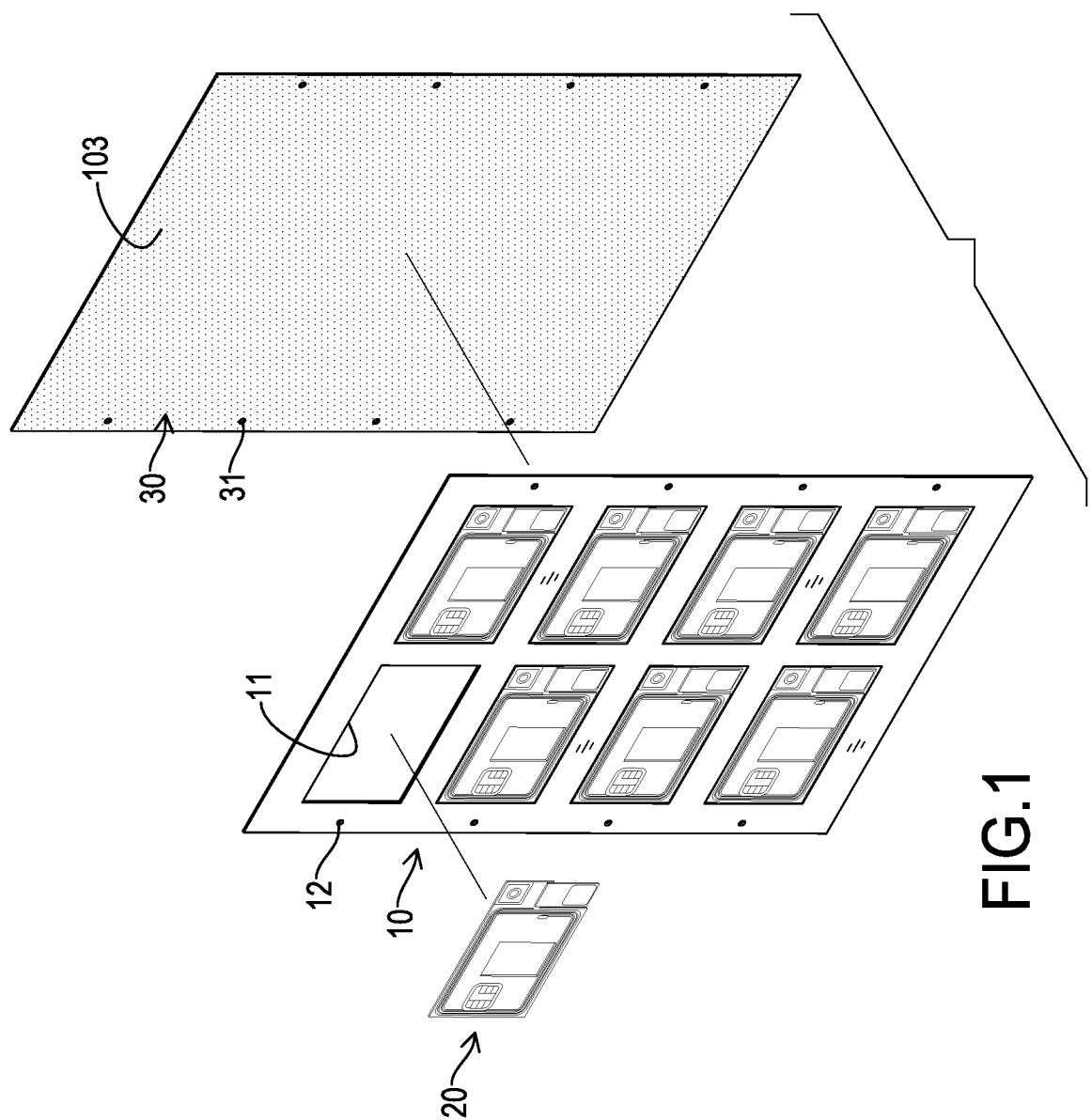
FIG. 1 is a partial exploded perspective view of a transitional layer for electronic modules in accordance with the present invention.

In order to understand the technical features and practical effects of the present invention in detail and implement the present invention according to the specification, the detailed description of a preferred embodiment shown in the drawings will be further described as follows.

Figure 2:
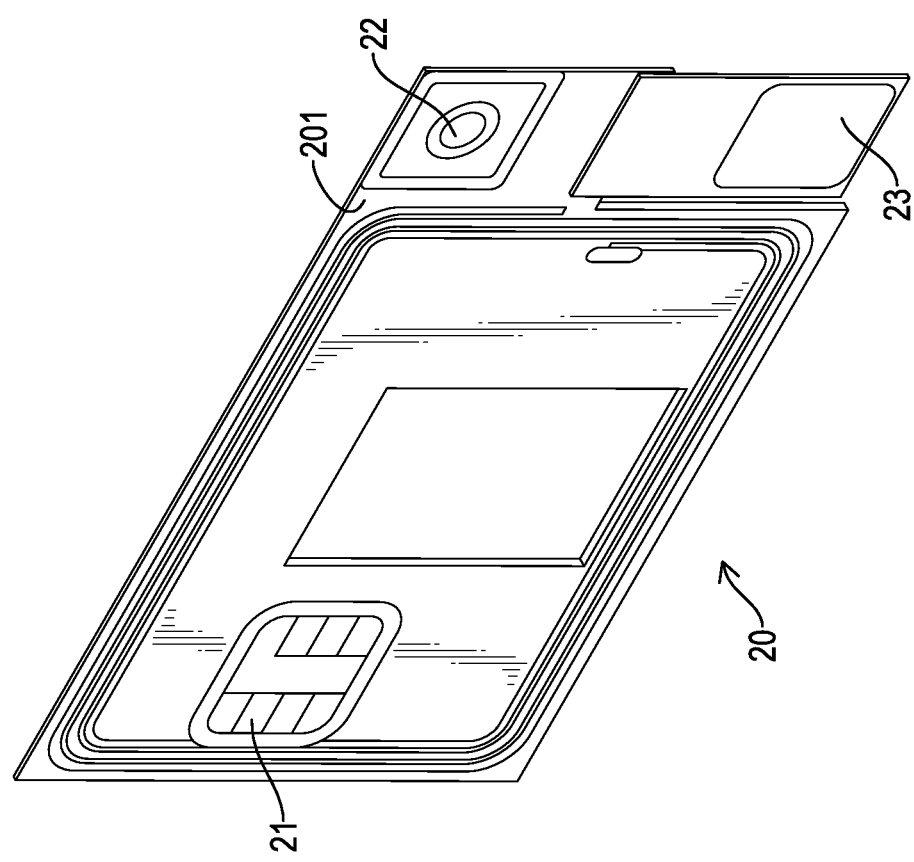
FIG. 2 is an enlarged perspective view of an electronic module of the transitional layer for electronic modules in FIG. 1.
Figure 3:
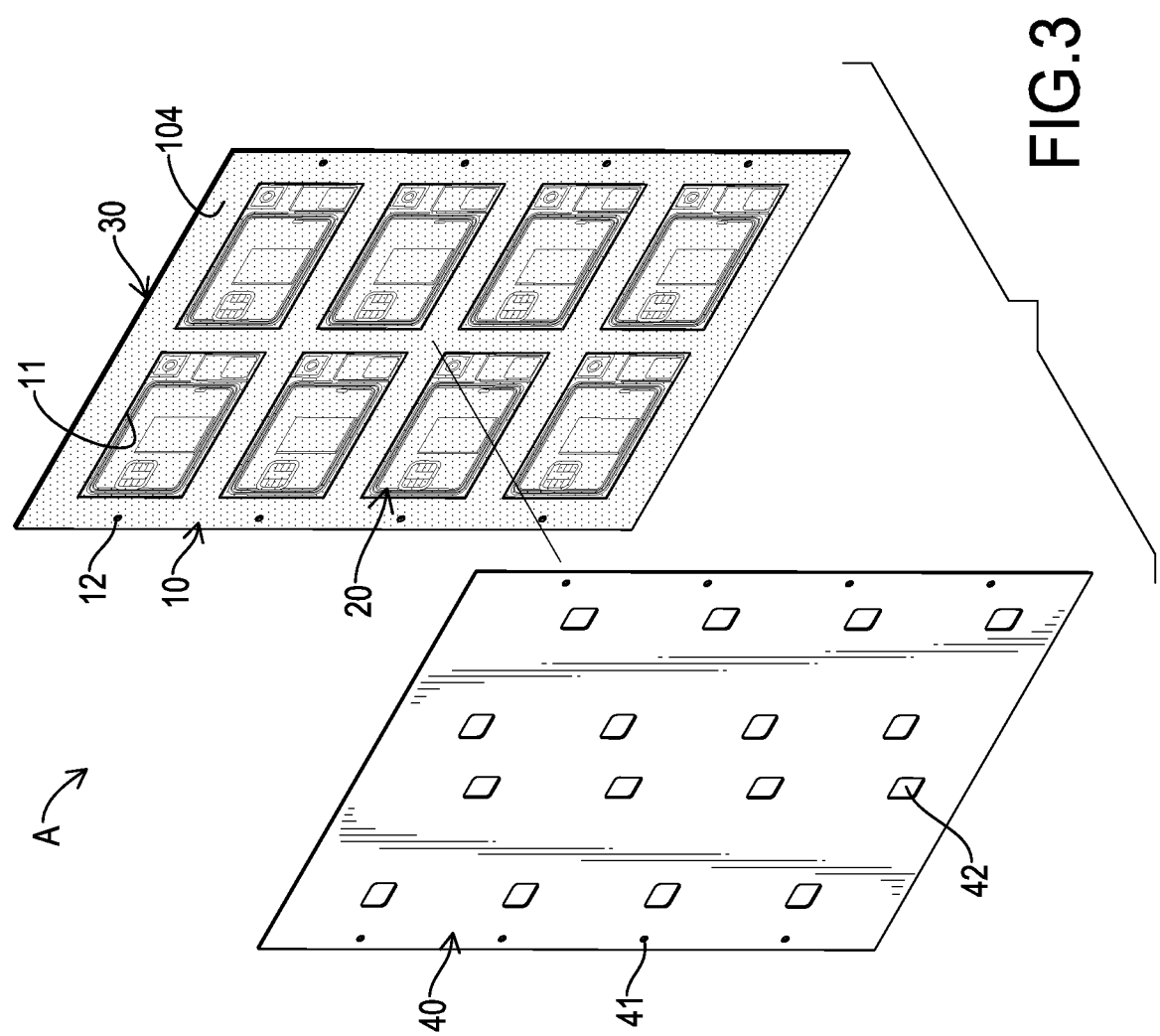
FIG. 3 is an exploded perspective view of the transitional layer for electronic modules in FIG. 1.

With reference to FIGS. 1 to 3, a transitional layer A comprises a substrate 10, multiple electronic modules 20, and two release papers 30, 40.

The substrate 10 is a board having multiple containing holes 11 and multiple positioning parts 12. The multiple containing holes 11 are respectively disposed through two side surfaces of the substrate 10 at spaced intervals, and are arranged in lines along a lengthwise direction and a widthwise direction of the substrate 10. Each one of the multiple containing holes 11 has a shape matching with the multiple electronic modules 20. The multiple positioning parts 12 are multiple through holes that are separately disposed through a pair of parallel sides of the substrate 10.

The multiple electronic modules 20 are mounted to the substrate 10, and are located in the multiple containing holes 11, respectively. With reference to FIG. 2, each one of the electronic modules 20 has multiple input elements comprising a chip 21, a button 22, and a fingerprint identification element 23. The chip 21, the button 22, and the fingerprint identification elements 23 are electrically connected. The chip 21, the button 22, and the fingerprint identification element 23 are disposed at spaced intervals on a same surface of the electronic module 20. Additionally, the multiple electronic modules 20 are identically oriented while being mounted to the substrate 10.

Figure 4:
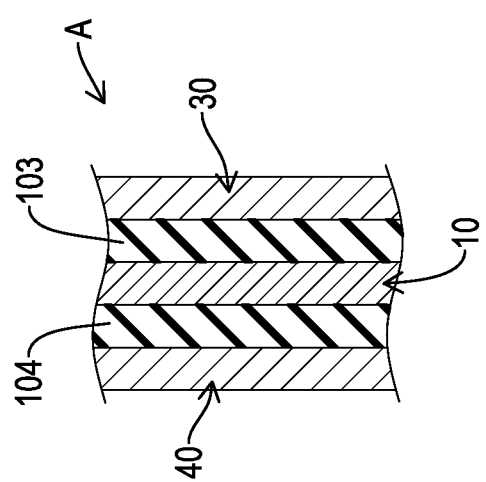
FIG. 4 is a side view in partial section of the transitional layer for electronic modules in FIG. 1.

With reference to FIGS. 1, 3, and 4, the two release papers 30, 40, which comprise a first release paper 30 and a second release paper 40, are both transparent. The two release papers 30, 40 are respectively pasted on two surfaces of the substrate 10 along with the multiple electronic modules 20 via an adhesive coat 103, 104. The first release paper 30 has multiple first release paper positioning parts 31. The first release paper positioning parts 31 may be marked points or through holes having equal inner diameters with the multiple positioning parts 12 of the substrate 10. Each one of the multiple first release paper positioning parts 31 aligns with a respective one of the multiple positioning parts 12 of the substrate 10. As a result, the first release paper 30 may be neatly pasted on the substrate 10 by overlapping the multiple positioning parts 12 of the substrate 10 with the multiple first release paper positioning parts 31.

The second release paper 40 has multiple second release paper positioning parts 41 and multiple operation holes 42. The second release paper positioning parts 41 may be marked points or through holes having equal inner diameters with the multiple positioning parts 12 of the substrate 10. Each one of the multiple second release paper positioning parts 41 aligns with a respective one of the multiple positioning parts 12 of the substrate 10. As a result, the second release paper 40 may be neatly pasted on the substrate 10 by overlapping the multiple positioning parts 12 of the substrate 10 with the multiple second release paper positioning parts 41. The multiple operation holes 42 are disposed through the second release paper 40. Also, the multiple operation holes 42 respectively align with the chips 21 or the fingerprint identification elements 23 of the multiple electronic modules 20, so each one of the chips 21 and each one of the fingerprint identification elements 23 are exposed respectively through one of the multiple operation holes 42.

By means of the aforementioned technical features, a user may directly use the transitional layer for electronic modules A to embed programmed codes into the multiple electronic modules 20 via the exposed chips 21 and the exposed fingerprint identification elements 23, through the multiple operation holes 42 of the second release paper 40. Throughout the process, the adhesive coats 103, 104 and the release papers 30, 40 provide the multiple electronic modules 20 with effects of packaging and protecting. Therefore, the multiple electronic modules 20 may be prevented from being bended and thereby being damaged by the transitional layer for electronic modules A, in comparison with the prior art.

Figure 5:
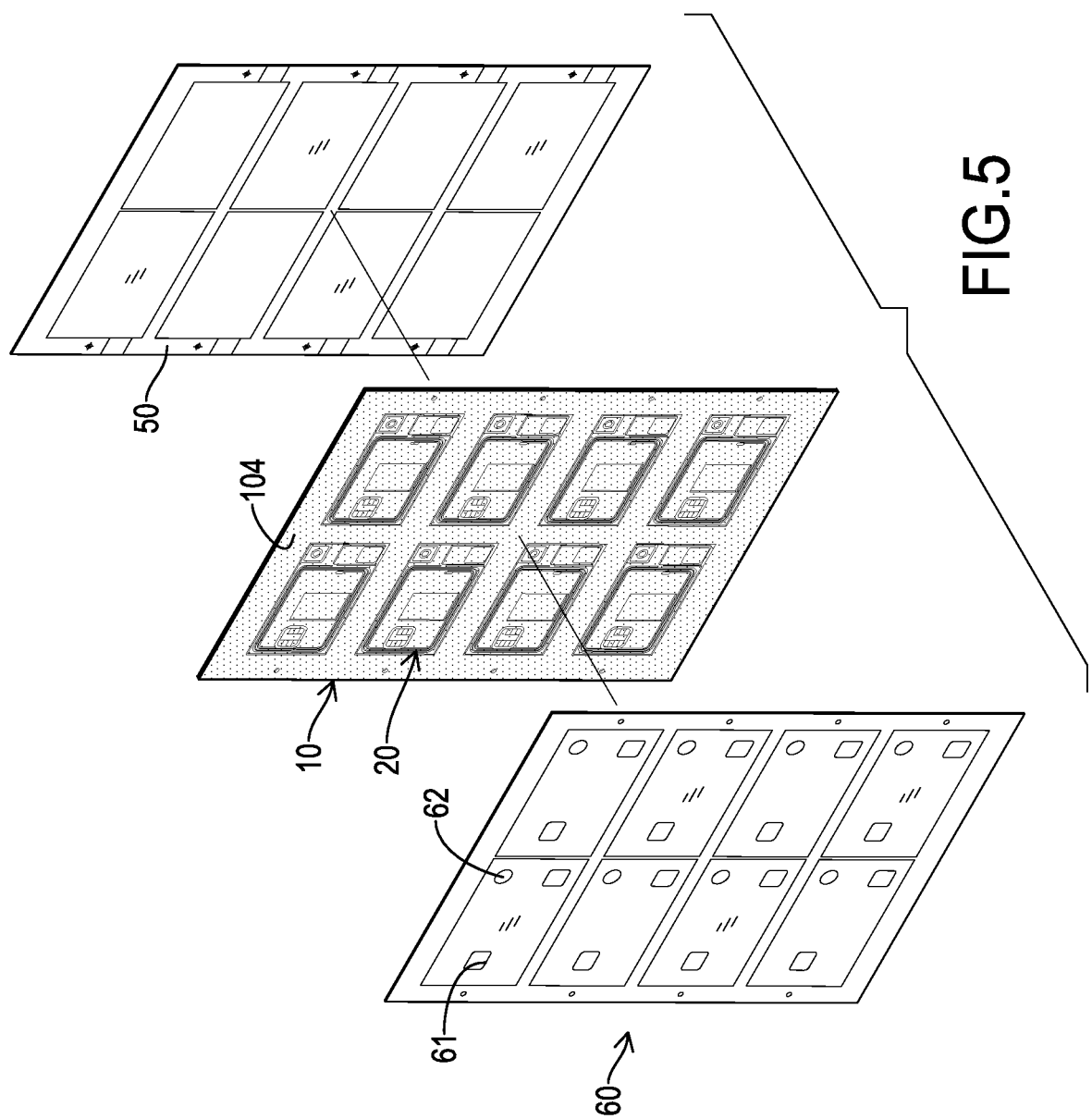
FIG. 5 is an operational view of the transitional layer for electronic modules in FIG. 1.
Figure 6:
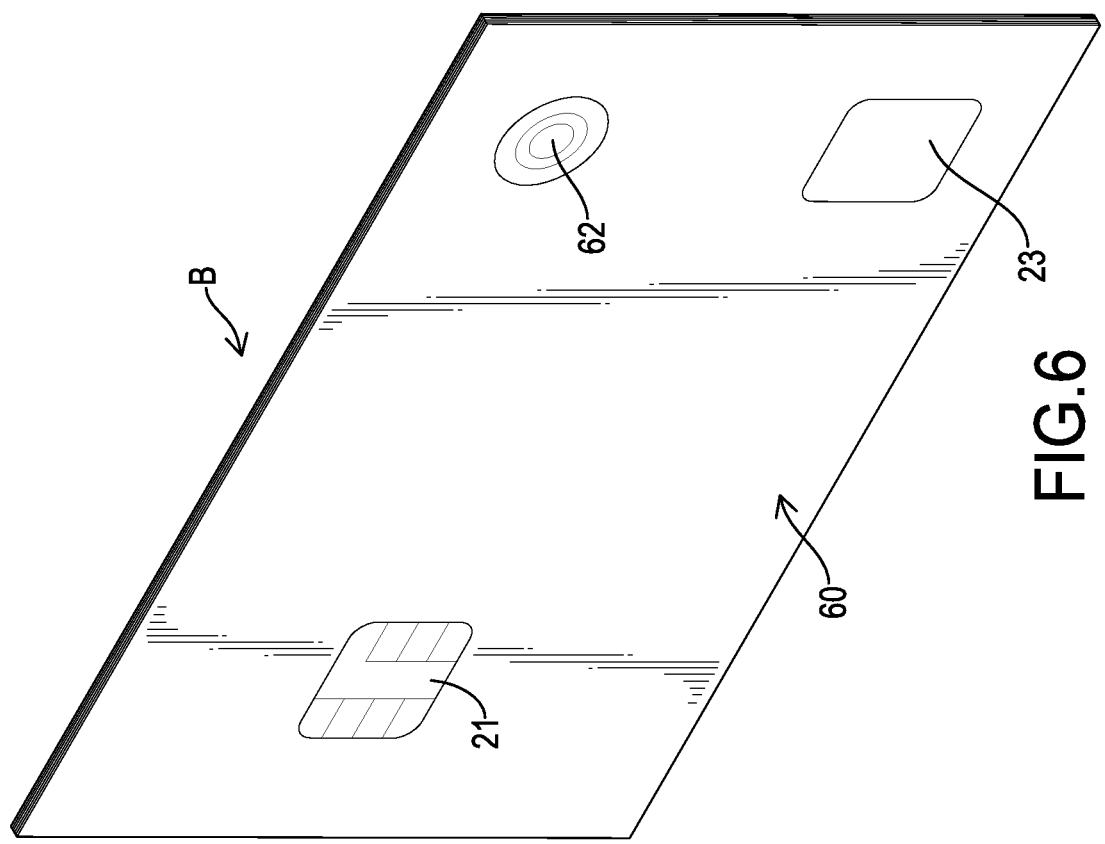
FIG. 6 is a perspective view of a finished product of the transitional layer for electronic modules in FIG. 1.

Moreover, with reference to FIGS. 5 and 6, after being programmed, the release papers 30, 40 may be removed, and the user may paste a first printed layer 50 and a second printed layer 60 on the two surfaces of the substrate 10 and the multiple electronic modules 20, respectively. In detail, the two printed layers 50, 60 are firstly covered on the two adhesive coats 103, 104, respectively. Next, the adhesive coats 103, 104 may be melted via a process of hot pressing, and thereby adhere the two printed layers 50, 60. After the adhesive coats 103, 104 resolidify, the two printed layers 50, 60 are attached to the transitional layer for electronic modules A.

The second printed layer 60 has multiple holes 61 and multiple button marks 62. The multiple holes 61 are disposed through the second printed layer 60 at spaced intervals. Each one of the multiple holes 61 aligns with a respective one of the chips 21 or a respective one of the fingerprint identification elements 23 of the multiple electronic modules 20, so the chips 21 and the fingerprint identification elements 23 are exposed through the multiple holes 61. The multiple button marks 62 are marked on a surface of the second printed layer 60 away from the substrate 10, and each one of the multiple button marks 62 aligns with and covers a respective one of the buttons 22 of the multiple electronic modules 20. After cutting, with reference to FIG. 6, multiple integrated circuit cards B may be obtained.

Figure 7:
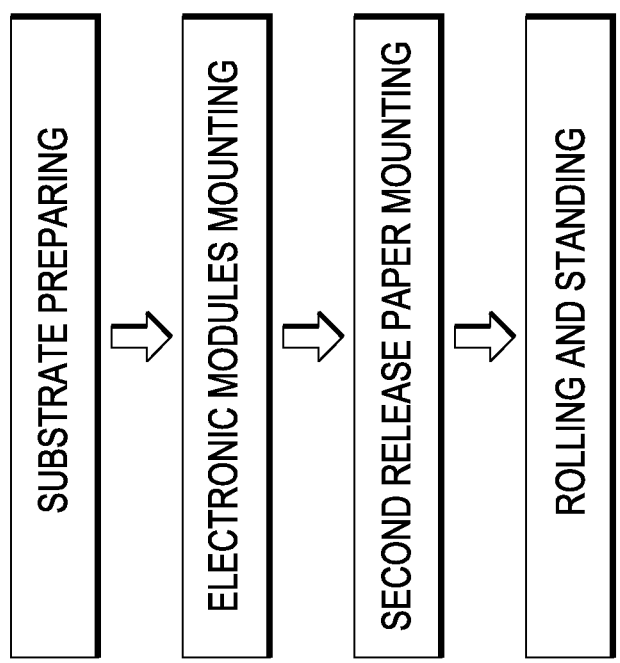
FIG. 7 is a flow diagram of a producing method of a transitional layer for electronic modules in accordance with the present invention.

A producing method of the transitional layer for electronic modules is also provided in the present invention. With reference to FIGS. 1 and 7, the producing method comprises the following steps.

A substrate preparing step: prepare a substrate 10 and a first release paper 30. Multiple containing holes 11 and multiple positioning parts 12 are disposed through the substrate 10. Multiple first release paper positioning parts 31 are disposed on the first release paper 30. After the first release paper 30 is coated with viscose, the first release paper 30 may be pasted on the substrate 10, by overlapping the multiple first release paper positioning parts 31 and the multiple positioning parts 12 of the substrate 10.

An electronic modules mounting step: prepare multiple electronic modules 20. With reference to FIG. 2, a chip 21, a button 22, and a fingerprint identification element 23 are electrically connected and located on a same surface of each one of the multiple electronic modules 20. The multiple electronic modules 20 are respectively put in the multiple containing holes 11 to be mounted to the substrate 10 and the first release paper 30. Besides, the multiple electronic modules 20 are identically oriented while being mounted to the substrate 10.

A second release paper mounting step: prepare a second release paper 40 having multiple second release paper positioning parts 41 and multiple operation holes 42. Coat a surface, which is away from the first release paper 30, of the substrate 10 along with the multiple electronic modules 20 with viscose. Thereby the second release paper 40 may be neatly pasted on the substrate 10 by overlapping the second release paper positioning parts 41 and the positioning parts 12 of the substrate 10. Furthermore, the multiple operation holes 42 communicate with the chips 21 and the fingerprint identification elements 23 of the multiple electronic modules 20.

A rolling and standing step: apply cold pressing on the two release papers 30, 40 with a roller module so as to squeeze the two release papers 30, 40, the substrate 10, and the multiple electronic modules 20 for air exhausting. Then the two release papers 30, 40 closely abut on the substrate 10. After a standing time, the viscose between the substrate 10, the electronic modules 20 and the two release papers 30, 40 will solidify and respectively form a first adhesive coat 103 and a second adhesive coat 104. The two adhesive coats 103, 104 closely cover the multiple electronic modules 20 and provide effects of flat packaging and protecting. A finished product of the transitional layer for electronic modules A is thereby produced, and moreover, the transitional layer for electronic modules A has flat surfaces.

Figure 8:
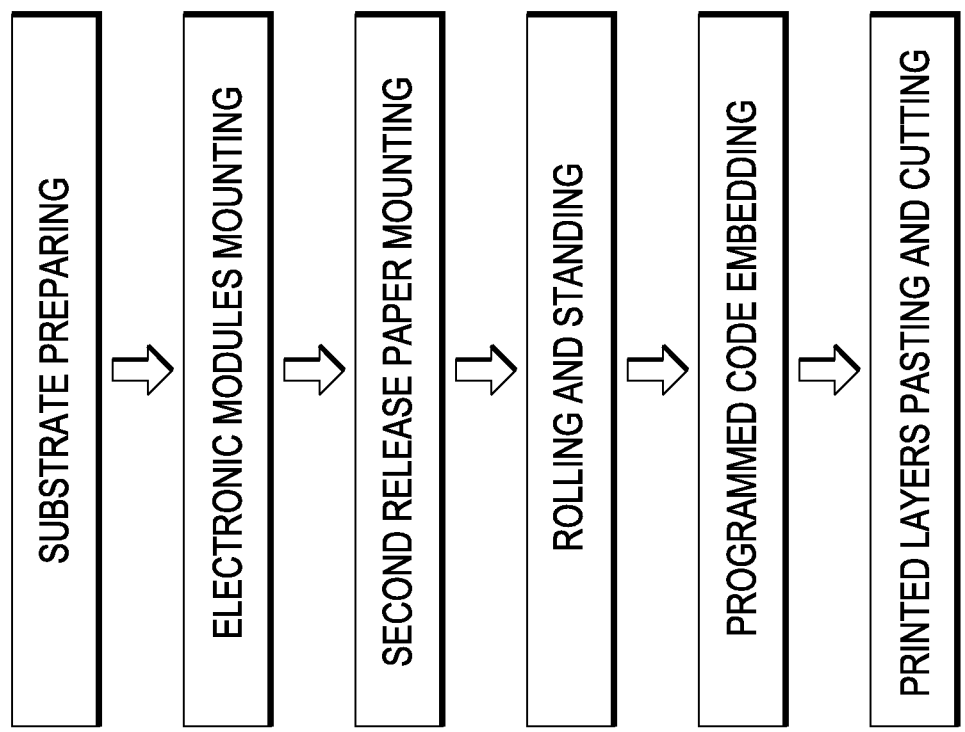
FIG. 8 is a flow diagram of a producing method of an integrated circuit card via the transitional layer for electronic modules in FIG. 1.

With the producing method of the transitional layer for electronic modules, a producing method of integrated circuit cards is further provided. With reference to FIG. 8, the producing method of integrated circuit cards comprises all the steps of the producing method of the transitional layer for electronic modules, and further comprises the following steps.

A programmed code embedding step: the user may press the buttons 22 of the multiple electronic modules 20 through the second release paper 40, and embed programmed codes into the electronic modules 20 via the chips 21 and the fingerprint identification elements 23 through the multiple operation holes 42 of the second release paper 40.

A printed layers pasting and cutting step: with reference to FIGS. 3 and 4, remove the two release papers 30, 40 of the transitional layer for electronic modules A, and paste a first printed layer 50 and a second printed layer 60 in replacement. Besides, multiple holes 61 are disposed through the second printed layer 60, and align with the chips 21 and the fingerprint identification elements 23 of the multiple electronic modules 20. Multiple button marks 62 are marked on the second printed layer 60 and cover the buttons 22 of the multiple electronic modules 20. Through a process of hot pressing, the two printed layers 50, 60 and the transitional layer for electronic modules A may be cut into multiple integrated circuit cards B.

With aforementioned technical features, the multiple electronic modules 20 are put in the containing holes 11 of the substrate 10, which is beforehand mounted with the first release paper 30. After mounting the second release paper 40, the user may produce integrated circuit cards easily with the transitional layer for electronic modules A, thereby not only improving working efficiency, but also preventing the multiple electronic modules 20 from being bended and damaged as well. Therefore, the producing method of the transitional layer for electronic modules in accordance with the present invention effectively improves the shortcoming of the prior art.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A transitional layer for electronic modules, the transitional layer comprising:
   a substrate having multiple containing holes disposed therethrough at spaced intervals;
   multiple electronic modules respectively mounted to the substrate, each one of the multiple electronic modules located in a respective one of the multiple containing holes and having at least one input element; and
   two release papers respectively mounted to the substrate and the multiple electronic modules via an adhesive coat, and at least one of the two release papers having multiple operation holes disposed therethrough and aligning with the input elements of the multiple electronic modules.

2. The transitional layer for electronic modules as claimed in claim 1, wherein each one of the multiple electronic modules has multiple said input elements, which comprise a chip, a button, and a fingerprint identification element, and the multiple input elements are disposed on a same surface of the electronic module.

3. The transitional layer for electronic modules as claimed in claim 2, wherein:

the multiple electronic modules are identically oriented and mounted to the substrate; and one of the two release papers has said multiple operation holes disposed therethrough, and respectively aligning with the input elements.

4. The transitional layer for electronic modules as claimed in claim 3, wherein:

the substrate has multiple positioning parts disposed at spaced intervals; and each one of the two release papers has multiple release paper positioning parts aligning with the multiple positioning parts of the substrate.

5. The transitional layer for electronic modules as claimed in claim 1, wherein:

the multiple electronic modules are identically oriented and mounted to the substrate; and one of the two release papers has said multiple operation holes disposed therethrough, and respectively aligning with the input elements.

6. The transitional layer for electronic modules as claimed in claim 5, wherein:

the substrate has multiple positioning parts disposed at spaced intervals; and each one of the two release papers has multiple release paper positioning parts aligning with the multiple positioning parts of the substrate.

7. A producing method of a transitional layer for electronic modules, and the producing method comprising:

a substrate preparing step for preparing:
a substrate having multiple containing holes disposed therethrough; and
a first release paper coated with viscose to paste on the substrate;

an electronic modules mounting step comprising:
preparing multiple electronic modules, wherein each one of the multiple electronic modules has at least one input element; and
putting each one of the multiple electronic modules in a respective one of the multiple containing holes; and a second release paper mounting step comprising:
preparing a second release paper with multiple operation holes;
coating the substrate and the multiple electronic modules with viscose; and
pasting the second release paper on the substrate, wherein each one of the multiple operation holes communicates with a respective one of the input elements of the multiple electronic modules.

8. The producing method of the transitional layer for electronic modules as claimed in claim 7, wherein in the substrate preparing step, the substrate has multiple positioning parts disposed at spaced intervals; and the first release paper has multiple first release paper positioning parts, and is pasted on the substrate by overlapping the multiple first release paper positioning parts and the multiple positioning parts of the substrate.

9. The producing method of the transitional layer for electronic modules as claimed in claim 8, wherein after the second release paper mounting step, the producing method further comprises:

a rolling and standing step comprising squeezing the first release paper and the second release paper for exhausting air between the substrate, the multiple electronic modules, the first release paper, and the second release paper, closely abutting the substrate, the first release paper, and the second release paper, and packaging the multiple electronic modules.

10. The producing method of the transitional layer for electronic modules as claimed in claim 7, wherein in the second release paper mounting step, the substrate has multiple positioning parts disposed at spaced intervals; and the second release paper has multiple second release paper positioning parts, and is pasted on the substrate by overlapping the multiple second release paper positioning parts and the multiple positioning parts of the substrate.

11. The producing method of the transitional layer for electronic modules as claimed in claim 10, wherein after the second release paper mounting step, the producing method further comprises:

a rolling and standing step comprising squeezing the first release paper and the second release paper for exhausting air between the substrate, the multiple electronic modules, the first release paper, and the second release paper, closely abutting the substrate, the first release paper, and the second release paper, and packaging the multiple electronic modules.

12. The producing method of the transitional layer for electronic modules as claimed in claim 7, wherein:

each one of the multiple electronic modules comprises multiple said input elements including:
a chip;
a button; and
a fingerprint identification element;

the second release paper has multiple operation holes disposed therethrough; and in the second release paper mounting step, the second release paper is pasted on the substrate with each one of the multiple operation holes communicating with a respective one of the chips or a respective one of the fingerprint identification elements of the multiple electronic modules.

13. The producing method of the transitional layer for electronic modules as claimed in claim 12, wherein after the second release paper mounting step, the producing method further comprises:

a rolling and standing step comprising squeezing the first release paper and the second release paper for exhausting air between the substrate, the multiple electronic modules, the first release paper, and the second release paper, closely abutting the substrate, the first release paper, and the second release paper, and packaging the multiple electronic modules.

14. The producing method of the transitional layer for electronic modules as claimed in claim 7, wherein after the second release paper mounting step, the producing method further comprises:

a rolling and standing step comprising squeezing the first release paper and the second release paper for exhausting air between the substrate, the multiple electronic modules, the first release paper, and the second release paper, closely abutting the substrate, the first release paper, and the second release paper, and packaging the multiple electronic modules.

15. A producing method of integrated circuit cards, with the producing method comprising:

a substrate preparing step for preparing:
a substrate having multiple containing holes disposed therethrough; and
a first release paper coated with viscose to paste on the substrate;

an electronic modules mounting step comprising:
  preparing multiple electronic modules, wherein each one of the multiple electronic modules has at least one input element; and
  putting each one of the multiple electronic modules in a respective one of the multiple containing holes;
a second release paper mounting step comprising:
  preparing a second release paper with multiple operation holes;
  coating the substrate and the multiple electronic modules with viscose; and
  pasting the second release paper on the substrate, wherein each one of the multiple operation holes communicates with a respective one of the input elements of the multiple electronic modules;
a rolling and standing step comprising squeezing the first release paper and the second release paper for exhausting air between the substrate, the multiple electronic modules, the first release paper, and the second release paper, closely abutting the substrate, the first release paper, and the second release paper, and packaging the multiple electronic modules;
a programmed code embedding step; and
a printed layers pasting and cutting step comprising:
  removing the first release paper and the second release paper;
  pasting two printed layers; and
  cutting the two printed layers, the substrate, and the multiple electronic modules into multiple integrated circuit cards.

16. The producing method of integrated circuit cards as claimed in claim 15, wherein in the substrate preparing step, the substrate has multiple positioning parts disposed at spaced intervals; and
the first release paper has multiple first release paper positioning parts, and is pasted on the substrate by overlapping the multiple first release paper positioning parts and the multiple positioning parts of the substrate.

17. The producing method of integrated circuit cards as claimed in claim 15, wherein in the second release paper mounting step,
the substrate has multiple positioning parts disposed at spaced intervals; and
the second release paper has multiple second release paper positioning parts, and is pasted on the substrate by overlapping the multiple second release paper positioning parts and the multiple positioning parts of the substrate.

18. The producing method of integrated circuit cards as claimed in claim 15, wherein:
each one of the multiple electronic modules comprises multiple said input elements including:
  a chip;
  a button; and
  a fingerprint identification element;
the second release paper has multiple operation holes disposed therethrough; and
in the second release paper mounting step, the second release paper is pasted on the substrate with each one of the multiple operation holes communicating with a respective one of the chips or a respective one of the fingerprint identification elements of the multiple electronic modules.

* * * * *